United States Patent [19]

Aubert et al.

[11] 4,012,879

[45] Mar. 22, 1977

[54] SUPPORTING DEVICE FOR HEAT-INSULATING PANELS

[75] Inventors: Michel Aubert, Manosque; Guy Lemercier, Le Puy Ste. Reparade, both of France

[73] Assignee: Commissariat a l'Energie Atomique, Paris, France

[22] Filed: June 10, 1976

[21] Appl. No.: 694,583

[30] Foreign Application Priority Data

June 16, 1975 France .................. 75.18768

[52] U.S. Cl. .................. 52/508; 52/406; 52/617; 403/386
[51] Int. Cl.² .................. E04B 1/38; E04B 2/28
[58] Field of Search .......... 52/508, 617, 621, 698, 52/406; 403/58, 386, 388; 339/95 A, 135

[56] References Cited

UNITED STATES PATENTS

| 1,909,559 | 5/1933 | Wagner | 52/483 |
|---|---|---|---|
| 2,118,103 | 5/1938 | Oeding | 339/135 X |
| 2,436,336 | 2/1948 | Slater | 403/58 |
| 2,746,771 | 5/1956 | Gross | 403/165 X |
| 3,129,531 | 4/1964 | Connor | 52/508 X |
| 3,285,311 | 11/1966 | Cushman | 52/617 X |
| 3,300,929 | 1/1967 | Fischer | 52/698 X |
| 3,945,165 | 3/1976 | Lemercier | 52/406 |
| 3,950,910 | 4/1976 | Pobanz | 52/621 X |

Primary Examiner—J. Karl Bell
Attorney, Agent, or Firm—Cameron, Kerkam, Sutton, Stowell & Stowell

[57] ABSTRACT

Heat-insulating panels applied against a bearing wall and extending parallel to the wall to be protected are supported by means of a device comprising a yoke rigidly fixed to the wall to be protected and fitted with a cross-pin, the link of a panel-supporting element being mounted freely around the cross-pin. A second yoke secured to the bearing wall is supported by means of a second cross-pin on which the last link of the supporting element is freely mounted.

6 Claims, 3 Drawing Figures

SUPPORTING DEVICE FOR HEAT-INSULATING PANELS

This invention relates to a device for supporting and fixing heat-insulating panels on a wall. Among the applications which can be contemplated, the invention is more especially concerned with the position-maintenance of panels which constitute a protective covering for the horizontal bottom lining plate and side walls of a vault roof which performs the function of a closure for the primary vessel and concrete vault of a fast reactor. The invention is also applicable to the protective covering providing for the sleeves which have a vertical axis and surround the penetrations for the internal reactor components.

It is known that, in current structural designs of fast reactors, the vessel containing the reactor core and a suitable volume of coolant (which is circulated through the core and usually consists of a liquid metal such as sodium) is closed at the top by a thick concrete slab surrounded by a metallic casing which is usually of steel. A layer of inert gas consisting in particular of argon is present above the level of sodium within the reactor vessel. It is also known that, under the conditions of operation of the reactor, the temperature in the argon atmosphere is of the order of 500° C, with the result that aerosols and sodium vapor are formed in said atmosphere and liable to come into contact with the bottom lining plate and side walls of the steel vault-roof casing. There is consequently a potential danger of rapid damage to the casing as a result of the effects which are caused mainly by mechanical stresses arising from differential thermal expansions and which can in some cases be caused by corrosion.

In order to overcome these disadvantages, it has already been proposed to mount against the vault roof in those portions which are in contact with the inert-gas atmosphere a protective heat-insulation covering in which are incorporated elements designed to afford resistance to corrosion and to set up an effective thermal barrier. Two design solutions of a covering of this type have been described and claimed in particular in U.S. patent applications Ser. No. 478.705 now U. S. Pat. No. 3,945,887 and 480.269 now U. S. Pat. No. 3,945,165. As disclosed in these latter, a set of panels each constituted by a mat of superposed wire-fabric or wire-mesh elements is mounted within a box or a series of adjacent boxes which are not leak-tight and are applied against the wall to be protected. Said boxes are so arranged as to have partially overlapping faces delimiting narrows spaces for trapping aerosols and sodium vapors and preventing these latter from reaching the mats of wire-fabric or wire-mesh elements contained in the boxes. The panels of the covering are supported by a metallic bearing wall which is parallel to the vault roof to be protected and are fixed against this latter by means of studs passed through the bearing wall and the panels. Said studs are rigidly fixed to the vault roof and each provided at the opposite end with a threaded portion in cooperating relation with a nut which serves to lock the panel in position against the bearing wall.

The present invention relates to an improvement in the means for supporting and fixing the heat-insulating panels of a covering of the type mentioned in the foregoing, the advantage of which is to permit a slight displacement of said panels with two degrees of freedom with respect to the plane of the wall to be protected. This improvement has the effect of removing any danger of faulty positioning and also of affording better resistance to stresses which result from friction or from differential thermal expansions produced by the thermal gradient on each side of the covering. The invention also makes it possible to limit the heat transfer resulting from the presence of the fixing studs in conventional designs and finally to improve the mechanical strength of the covering.

To this end, the device under consideration essentially comprises a first yoke rigidly fixed to the wall to be protected and adapted to carry a first cross-pin around which is mounted a first link of a supporting element, said link being capable of moving with respect to said first crosspin, and a second yoke joined to a bearing wall, the heat-insulating panels being applied against said bearing wall and so arranged as to extend parallel to the wall to be protected, said second yoke being supported by means of a second cross-pin by the last link of the supporting element, said last link being free with respect to said second cross-pin.

As an advantageous feature, the second yoke comprises a threaded end-piece which cooperates with a nut for clamping the bearing wall against the heat-insulating panels and makes it possible to adjust the thickness of the covering. The head of the threaded end-piece and the clamping nut can then be protected by a cover which is fixed against the bearing plate.

Preferably and especially in the case in which heat-insulating panels are contained in adjacent modular panels of the type described and claimed in U.S. patent application Ser. No. 480.269 of June 17, 1974, the second yoke is provided with a metallic seal which cooperates with the bearing wall.

In a first embodiment, the supporting element is constituted by a chain. In another embodiment, the supporting element is constituted by a cardan-joint crosspiece, the perpendicular cross-pins of which are supported respectively by the first and the second yokes.

Further characteristic features of a fixing device for heat-insulating panels in accordance with the invention will become apparent from the following description of two examples of construction which are given by way of indication and not in any limiting sense, reference being made to the accompanying drawings, wherein.

Figure 1:
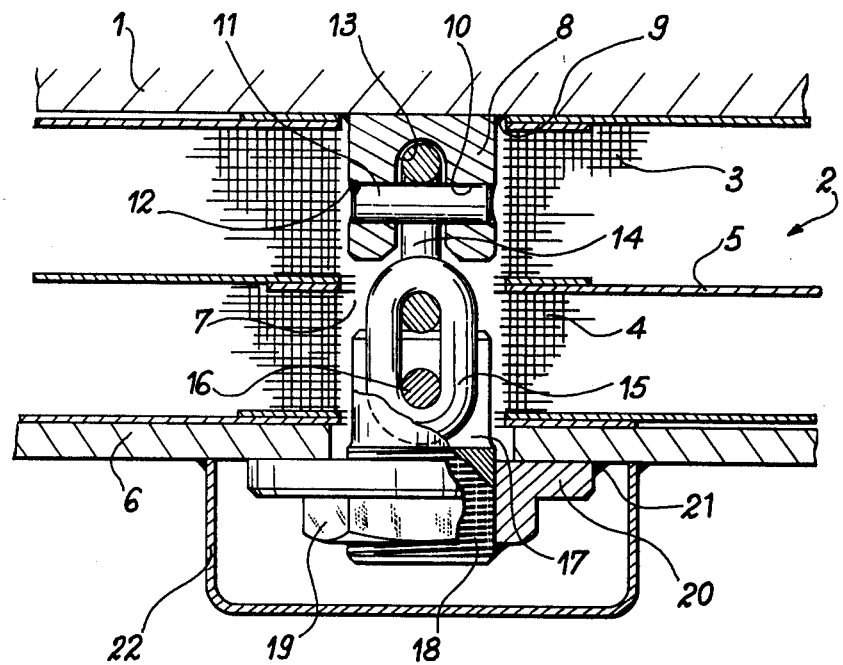
FIG. 1 is a diagrammatic part-sectional view of the device under consideration which is mounted between a bearing wall and a wall to be protected so as to compress heat-insulating panels against this latter.

In FIG. 1, the reference numeral 1 designates the partially illustrated bottom portion of a biological shield slab, especially the vault roof which serves as a closure structure for the vessel of a fast nuclear reactor. It should be understood, however, that the application of the device could be contemplated in any other field since the arrangements provided by the invention are not limited either to the particular nature of the wall to be protected or to its environmental conditions.

In the example considered, the bottom lining plate of the vault roof 1 is protected against an atmosphere containing aerosols and sodium vapor by means of the presence of a heat-insulation covering 2 constituted by superposed insulation layers 3 and 4 each formed in a manner which is known per se by a stack of wire-fabric or wire-mesh elements. Said insulation layers 3 and 4 are advantageously separated by thin intermediate sheet-metal elements 5 which improve the thermal-barrier effect of said layers. Finally, the covering 2 is supported and applied against the underface of the vault roof 1 by means of a metallic bearing wall or so-called casing plate, said wall being constituted by a plate 6 of relatively substantial thickness and constructed in one piece or in a plurality of juxtaposed sections.

In accordance with the invention, the covering is maintained against the wall 1 by the bearing plate 6 by making use of a fixing device arranged within a hole 7 formed through the covering 2 and the plate 6. This device comprises in particular a first yoke 8 which is rigidly fixed to the underface of the vault roof 1 by means of a weld fillet 9, for example. Said yoke 8 has a transverse bore 10, a locking-pin 11 being engaged within said bore and stationarily fixed therein by means of spot welds 12. Moreover, the yoke 8 has an open groove 13 forming a housing for a first chain link 14 which is supported by the cross-pin 11 within the yoke. A second chain link 15 is mounted on said first link 14 and in turn supports by means of a cross-pin 16 in a second yoke 17 which is similar to the first. Said yoke 17 has an extension in the form of a threaded end-piece 18 and this latter is capable of cooperating with a nut 19 having a lateral annular shoulder 20 which is intended to be applied against the underface of the bearing plate 6, thus ensuring that the covering is maintained in position beneath the vault roof 1 while at the same time clamping and consequently producing relative compression of the insulation layers 3 and 4 of the covering 2. There can be formed in the yoke 17 a blind-end bore which permits the use of a tool for mounting the heat-insulating panels and also serves to secure a jack for compacting said panels. Once the nut 19 has been placed in position and tightened on the threaded end-piece 18 of the yoke 17, the transverse annular shoulder 20 is stationarily fixed with respect to the bearing plate 6 by welding at 21. Finally and in accordance with an advantageous arrangement, the assembly constituted by the nut 19 and the threaded portion 18 of the yoke 17 is protected from the external atmosphere by means of a cover 22 which is also secured by welding beneath the plate 6.

Figure 2:
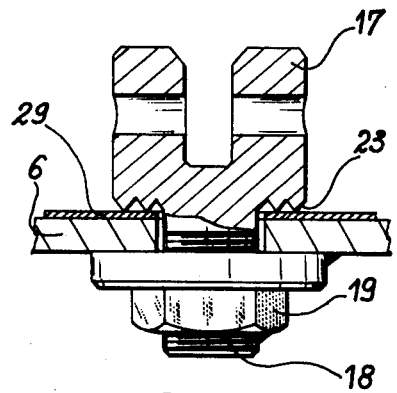
FIG. 2 is a detail view of an alternative design of the second yoke which is employed in the construction of the device.

In an alternative form of construction which is illustrated in FIG. 2, in which the bearing plate 6 engages beneath the yoke 17 between this latter and the nut 19, the yoke can advantageously be fitted with a metallic seal 23 which is intended to cooperate with the surface of a sealing plate constituted for example by the bottom wall 29 of a half-casing which rests on the plate 6. This makes it possible at the time of compression of the covering 2 by tightening of the nut 19 to ensure leak-tightness with respect to the external argon atmosphere at the point of penetration of the plate 6.

Figure 3:
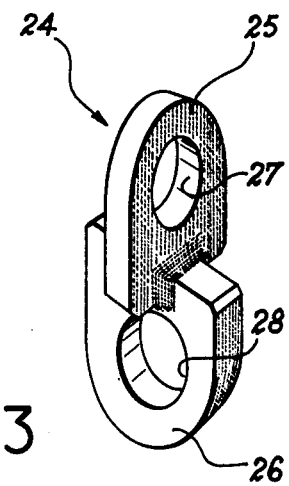
FIG. 3 is a detail view in perspective showing another alternative design of the supporting element of the device.

Finally, in another alternative form of construction shown in FIG. 3, the chain constituted by the links contemplated in the example according to FIG. 1 or FIG. 2 is replaced by a cardan-joint cross-piece 24 having two ears 25 and 26 respectively which are welded to each other but extend in two perpendicular planes respectively. Said ears have bores 27 and 28 for mounting two cross-pins so as to provide a connection with the yokes, one yoke being joined to the wall to be protected and the other yoke being clamped in position by means of a nut for compressing the panels of the heat-insulation covering.

Accordingly, whatever form of construction is adopted, the device which is proposed has two transverse degrees of freedom with respect to the wall against which the protective covering is applied and makes it possible in particular to remove any danger of faulty positioning at the time of assembly of said covering. A noteworthy advantage of this arrangement lies in the fact that the elements of the bottom bearing plate can readily be mounted in position in all cases, even in the event of slight misalignment with respect to the vertical, the top yoke of the device having previously been welded to the wall to be protected. The use of a chain element or the like also permits a slight displacement at right angles to the wall to be protected as a result of a transverse displacement of the bearing plate whilst the pressure rise which consequently takes place remains very small in all cases.

A further advantage of the anchoring device lies in the fact that this latter works practically only under tensile stress and under shearing stress while avoiding any bending stress, thus improving the mechanical strength of the heat insulation. Furthermore, the use of chain-link elements makes it possible to reduce the creation of thermal bridges and also results in good friction behavior. Finally, as shown in the example of FIG. 1, the device permits slight rotational displacement of the axis of the device at right angles to the plane of the wall to be protected; on the other hand, in the case of the alternative form shown in FIG. 3, no movement of rotation can be contemplated since the device which is proposed is endowed with a higher degree of strength and rigidity.

As has already been brought out by the foregoing, the present invention is clearly not limited solely to the examples of construction which have been more especially described with reference to the accompanying drawings but extends on the contrary to all alternative forms. In particular, the arrangements in accordance with the invention could be adapted so as to insulate a region which is adjacent to the wall to be protected whilst the heat-insulation material is placed at a given distance from said wall. In particular, a practical application of this type could correspond to the forms of construction which have been claimed in

What we claim is :

1. A supporting device for heat-insulating panels to be placed opposite to a wall to be protected, especially the vault roof of a fast reactor, wherein said device comprises a first yoke rigidly fixed to the wall to be protected and adapted to carry a first cross-pin around which is mounted a first link of a supporting element, said link being capable of moving with respect to said first cross-pin, and a second yoke joined to a bearing wall, the heat-insulating panels being applied against said bearing wall and so arranged as to extend parallel to the wall to be protected, said second yoke being supported by means of a second cross-pin by the last link of the supporting element, said last link being free with respect to said second cross-pin.

2. A supporting device according to claim 1, wherein the second yoke comprises a threaded end-piece which cooperates with a nut for clamping the bearing wall against the heat-insulating panels.

3. A supporting device according to claim 2, wherein the head of the threaded end-piece and the clamping nut are protected by a cover which is fixed against the bearing plate.

4. A supporting device according to claim 1, wherein the second yoke is provided with a metallic seal, said seal being adapted to cooperate with a sealing plate which rests on the bearing wall.

5. A supporting device according to claim 1, wherein the supporting element is constituted by a chain.

6. A supporting device according to claim 1, wherein the supporting element is constituted by at least one cardan-joint cross-piece, the perpendicular cross-pins of said crosspiece being supported respectively by the first and the second yokes.

* * * * *